US012747788B2

(12) United States Patent
Iversen et al.

(10) Patent No.: US 12,747,788 B2
(45) Date of Patent: Sep. 29, 2026

(54) WEAR RING AND WEAR RING ARRANGEMENT

(71) Applicant: Trelleborg Sealing Solutions Germany GmbH, Stuttgart (DE)

(72) Inventors: Gert Moelsted Iversen, Helsingoer (DK); Agge Tonndorff, Virum (DK); Anders Kvist Bjergvang, Weston-super-Mare (GB)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 18/069,368

(22) Filed: Dec. 21, 2022

(65) Prior Publication Data

US 2023/0120454 A1 Apr. 20, 2023

Related U.S. Application Data

(63) Continuation of application No. PCT/EP2020/067516, filed on Jun. 23, 2020.

(51) Int. Cl.

*F16J 9/22* (2006.01)
*F16J 9/20* (2006.01)
*F16J 9/28* (2006.01)

(52) U.S. Cl.

CPC .................. *F16J 9/22* (2013.01); *F16J 9/20* (2013.01); *F16J 9/28* (2013.01)

(58) Field of Classification Search

CPC .......... F16J 9/20; F16J 9/22; F16J 9/28; F16J 9/203; F16J 9/206

See application file for complete search history.

(56) References Cited

U.S. PATENT DOCUMENTS 1,596,691 A * 8/1926 Solenberger ............... F16J 9/20 277/464
1,636,027 A * 7/1927 Walter ........................ F16J 9/20 277/464
1,757,877 A * 5/1930 Roberts ....................... F16J 9/20 277/497

(Continued)

FOREIGN PATENT DOCUMENTS

CN 202130012 U 2/2012
CN 102536872 A 7/2012

(Continued)

*Primary Examiner* — Christine M Mills
*Assistant Examiner* — L. Susmitha Koneru
(74) *Attorney, Agent, or Firm* — Orbit IP, LLP; Marc G. Martino

(57) ABSTRACT

A wear ring for guidance of two machine components are arranged movably relative to one another along/around a movement axis, which is formed in one piece from a plastic or a reinforced plastic material and which is slit such that it has two free ends. The wear ring has a cross-sectional width W, which at least sectionally, increases in a radial direction towards the rear side of the wear ring. The wear ring has one or more recesses formed on its front side and/or on its the rear side for increasing its deformability and thus facilitate mounting thereof in a mounting groove of a machine element. Furthermore, a wear ring arrangement with a wear ring can be clipped into a mounting groove of one of the machine components of the wear ring arrangement.

15 Claims, 7 Drawing Sheets

(56) References Cited

U.S. PATENT DOCUMENTS

| | | | | | |
|---|---|---|---|---|---|
| 1,769,974 | A * | 7/1930 | Szekely | F16J 9/20 | 277/464 |
| 1,819,581 | A * | 8/1931 | Williams | F16J 9/20 | 277/467 |
| 1,819,582 | A * | 8/1931 | Williams | F16J 9/20 | 277/467 |
| 3,174,761 | A * | 3/1965 | Workman | F16J 15/32 | 277/467 |
| 3,751,784 | A * | 8/1973 | Packard | F16J 9/02 | 277/435 |
| 3,920,254 | A * | 11/1975 | Johnston | F16J 15/32 | 277/467 |
| 4,516,481 | A * | 5/1985 | Geffroy | F16J 9/16 | 92/158 |
| 5,150,925 | A * | 9/1992 | Yokomatsu | F16L 33/227 | 285/104 |
| 5,169,162 | A * | 12/1992 | Azaml | F04B 39/042 | 92/158 |
| 8,313,104 | B2 * | 11/2012 | Maeda | F16J 15/3244 | 277/459 |
| 8,561,999 | B2 * | 10/2013 | Maeda | F16J 15/3208 | 277/459 |
| 9,188,134 | B2 | 11/2015 | Üre Villoria | | |
| 9,677,616 | B2 | 6/2017 | Arnault et al. | | |
| 9,702,409 | B2 | 7/2017 | Arnault et al. | | |
| 10,077,842 | B2 | 9/2018 | Feistel | | |
| 10,349,643 | B2 | 7/2019 | Gnann et al. | | |
| 10,435,000 | B2 | 10/2019 | Hanschek et al. | | |
| 10,690,248 | B2 | 6/2020 | Gronitzki | | |
| 11,118,682 | B2 | 9/2021 | Jordan et al. | | |
| 11,131,384 | B2 | 9/2021 | Jordan et al. | | |
| 2005/0109289 | A1 * | 5/2005 | Usui | F16J 9/20 | 123/19 |
| 2010/0133757 | A1 * | 6/2010 | Maeda | F16J 15/3244 | 277/436 |
| 2011/0298274 | A1 | 12/2011 | Simula et al. | | |
| 2012/0156012 | A1 | 6/2012 | Villoria | | |
| 2013/0098329 | A1 | 4/2013 | Chipperfield | | |
| 2014/0353915 | A1 | 12/2014 | Jordan | | |
| 2016/0245406 | A1 | 8/2016 | Ryther et al. | | |
| 2018/0292007 | A1 * | 10/2018 | Khonsari | F16J 9/20 | |
| 2019/0101211 | A1 | 4/2019 | Jinbo | | |
| 2020/0017129 | A1 | 1/2020 | Lumpkin et al. | | |

FOREIGN PATENT DOCUMENTS

| | | | |
|---|---|---|---|
| CN | 202520937 | A | 11/2012 |
| CN | 202883347 | U | 4/2013 |
| CN | 103527465 | A | 1/2014 |
| CN | 203640983 | U | 6/2014 |
| CN | 203655458 | U | 6/2014 |
| CN | 104220795 | A | 12/2014 |
| CN | 104554504 | A | 4/2015 |
| CN | 105899859 | A | 8/2016 |
| CN | 105987093 | A | 10/2016 |
| CN | 106015383 | A | 10/2016 |
| CN | 107339232 | A | 11/2017 |
| CN | 107426987 | A | 12/2017 |
| CN | 107524296 | A | 12/2017 |
| CN | 108555419 | A | 9/2018 |
| CN | 109611408 | A | 4/2019 |
| CN | 110325771 | A | 10/2019 |
| CN | 110382932 | A | 10/2019 |
| CN | 209818936 | U | 12/2019 |
| CN | 210265828 | U | 4/2020 |
| CN | 210531235 | U | 5/2020 |
| DE | 24 61 455 | C3 | 7/1980 |
| DE | 20 2010 004 934 | U1 | 8/2011 |
| GB | 729306 | A | 5/1955 |
| JP | S52-70269 | A | 6/1977 |
| JP | H11-82738 | A | 3/1999 |
| JP | 2005-090443 | A | 4/2005 |
| JP | 2012-229759 | A | 11/2012 |
| JP | 2020-504277 | A | 2/2020 |
| WO | 2016/206690 | A1 | 12/2016 |

* cited by examiner

WEAR RING AND WEAR RING ARRANGEMENT

CROSS-REFERENCE TO RELATED APPLICATIONS

This continuation application claims priority to PCT/EP2020/067516 filed on Jun. 23, 2020, which has published as WO 2021/259456 A1, the entire contents of which are fully incorporated herein with these references.

DESCRIPTION

Field of the Invention

The invention relates to a wear ring as well as a wear ring arrangement.

Background of the Invention

Wear rings, which are also referred to as guide rings, are used to guide two machine components which are movable relative to one another along/around a movement axis. For instance, wear rings are used to guide a piston or piston rod within a hydraulic cylinder, absorbing transverse forces. At the same time, wear rings prevent mechanical contact of the said machine components thereby optimizing the overall performance and longevity of the respective sealing system which is used for sealing off a sealing gap formed between the two machine components.

Wear rings have for long been typically made of metal, in particular stainless steel or brass. However, non-metallic wear rings have become well established in a wide range of applications as they do offer advantages when compared to their metallic pendants. As to this, the non-metallic wear rings do allow an elimination of an unfavorable local overstressing, show a high degree of wear resistance and a long service life. Further, they offer low friction as well as superior damping characteristics with regards to undesirable vibrations.

Plastic or reinforced plastic wear rings are generally slit such that they have two free ends spaced apart from and facing one another. The wear rings are usually installed in a mounting groove formed by one of the machine components. However, the flexible nature of the wear ring generally necessitates further fixation of the wear ring to the machine component provided with the mounting groove at least until the two machine components are assembled. In practice, this is commonly achieved by bonding the wear ring to the respective machine component. This, however, greatly complicates and delays installation of the wear ring within the dedicated mounting groove and effects an undue increase of manufacturing costs of the wear ring arrangement.

It is, therefore, the object of the present invention to provide a wear ring as well as a wear ring arrangement which can be mounted more easily and more cost-effectively.

SUMMARY OF THE INVENTION

The first object of the invention is solved by the wear ring according to claim 1. The wear ring arrangement according to the invention has the features as given in claim 12.

The wear ring according to the invention is formed in one piece from an elastically deformable plastic or a reinforced plastic material. For instance, PTFE (Polytetrafluoroethylene) or a polyethylene material is considered a suitable material. The wear ring is slit such that it has two free ends. This allows a temporary widening of the wear ring to further facilitate mounting of the wear ring within the mounting groove of a machine component or demounting of the wear ring. The wear ring has a front side, a rear side and two flanks, wherein the wear ring has a cross-sectional width, which, in a radial direction, at least sectionally increases towards the rear side thereof. The wear ring, due to its elastically deformable material, can thus be clipped directly into a mounting groove of a machine component, e.g., a piston/piston rod of a hydraulic or pneumatic piston-cylinder unit, which is designed such as to correspond thereto. The wear ring has one or more recesses which are formed on its front side and/or on its rear side and which serve to facilitate bending/twisting or carding of the wear ring such that the wear ring can be more easily mounted in the mounting groove of the respective machine element, in particular, piston or piston rod. This allows for a quicker and more cost-efficient mounting of the wear ring. It is clear that the recesses must significantly weaken the material of the wear ring so as to allow for an easier deformation thereof. As to this, the depth of each recess preferably exceeds 20% of the nominal thickness of the wear ring. Further, during use of the wear ring, the recesses can take up accumulating particulate matter to help prevent jams of the machine components arranged movably relative to one another. During mounting of the wear ring, (gluing) the usual bonding of the wear ring to the machine component featuring the mounting groove can be dropped. Further, it needs to be noted that mounting of the wear ring in its predetermined position within the said mounting groove can be more reliably and reproducibly achieved. The said recesses are easy to manufacture and can be realized right during molding of the wear ring or thereafter.

The recess or recesses of the front side and the recess or recesses of the rear side are preferably (each) spaced from one another in the direction of the central axis of the wear ring. This allows for a further facilitated twisting/bending of the wear ring as needed for mounting the wear ring in the said mounting groove of a machine component. This is, in particular, advantageous in wear rings having a larger diameter and which are generally rather difficult to install. Further, an undesirable fracture of the wear ring during its installation or during use can thereby be counteracted.

According to a further embodiment of the invention, the wear ring has, in each cross-section and over its entire circumferential extension, a single recess or a plurality of recesses, in particular two, three or four recesses, wherein the overall depth of all recesses in each cross-section of the wear ring is greater than two thirds of the nominal thickness of the wear ring. This allows for a high degree of deformability of the wear ring yet preserves a sufficient strength of the wear ring to resist an unwanted prying of the wear ring out of the mounting groove once placed therein. According to a preferred embodiment of the invention, the overall depth of all the recesses in each cross-section of the wear ring is greater than the nominal thickness of the wear ring.

Each or at least part of the recesses can be formed as a groove. The said grooves can have groove flanks which, in the cross section, are arranged symmetrically relative to a center axis of the recess/groove arranged perpendicular to the front side of the wear ring or the median plane of the wear ring.

According to a further embodiment of the invention, in the cross-section of the wear ring, the center axis of a respective groove can be inclined with respect to the local radius or median plane the wear ring.

The respective opening angle δ of at least part of or each of the recesses of the wear ring is preferably between 25° and 60°, in particular between 30° and 50°. The recesses of the wear ring can have the same or different opening angle δ.

Moreover, in a cross-sectional view of the wear ring, at least a part of the recesses/grooves can show a dilated bottom section. The recesses/grooves thus comprise a bubble- or cup-shaped cavity. This can further enhance the flexible deformability of the wear ring without sacrificing too much of the functional support surface on the front and/or rear side thereof. Further, each or part of the said recesses of the wear ring may be formed as a blind hole, or even as a through-recess or slit.

According to a preferred embodiment of the invention, the wear ring has, at least sectionally or over its entire circumferential extension, a dovetail cross-sectional shape. This allows for a bilateral engagement of the machine component featuring the mounting groove once the wear ring has been clipped into the said groove. By this, the wear ring will stay in its predetermined position within the mounting groove even when subjected to shear stress.

According to an alternative embodiment of the invention, the wear ring, on at least one or on each of its side flanks, has one or more lateral projections extending away from the respective side flank. These projections, due to the elastically deformable material of the wear ring, can be easily deflected and thus allow for an even easier insertion/clipping of the wear ring into the respective mounting groove of a machine component. In case of a plurality of projections arranged on the respective side flank, these are preferably spaced at regular intervals from one another in the circumferential direction of the wear ring.

The lateral projections preferably have a triangular or a rectangular cross-sectional shape. This is easy to manufacture, in particular by injection molding, and allows for an easy clipping of the wear ring into the mounting groove as well as for a secure seat therein.

The wear ring arrangement according to the invention comprises: a first and a second machine component which are movable along and/or around a movement axis relative to one another, confining a sealing gap therebetween, wherein one of the machine components is provided with a mounting groove confined by grove flanks forming bilateral undercuts; and a wear ring as described above and which is clipped into said mounting groove in a detachable fashion and which prevents a direct mechanical contact of the said machine components.

According to the invention, the machine component having the mounting groove and the wear ring are preferably joined together by a dovetail joint. This allows an easy mounting and securing of the wear ring in its predefined mounting position within the mounting groove without the need for further fixation means such as glue and the like. Further, the mounting of the first and second machine component, e.g., a piston rod/piston and a cylinder, can thereby be facilitated and accelerated. This further allows for cost advantages. Also, it needs to be noted that a replacement of the wear ring is greatly facilitated without the need for a laborious removal of the wear ring.

DETAILED DESCRIPTION OF THE PREFERRED EMBODIMENTS

Figure 1:
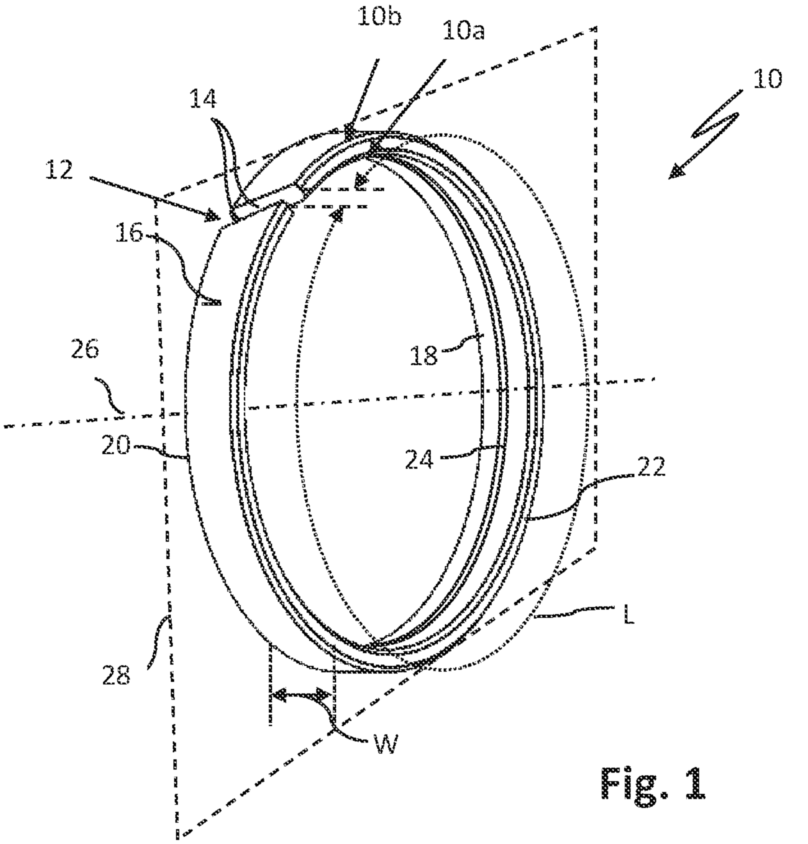
FIG. 1 is a perspective view of a slit wear ring according to the invention.

FIG. 1 depicts a perspective view of a slit wear ring 10 for guidance of two machine components movable relative to one another along/around a movement axis. The wear ring serves to handle transverse loads to prevent an undesirable direct mutual contact of the said machine components. The wear ring features a base segment 10*a* for mounting the wear ring 10 in a mounting groove of one of the machine components and a wearing or supporting segment 10*b* for contact of the respective other machine component. Due to slit 12 of the wear ring 10, the wear ring 10 has two free ends 14 in the circumferential direction thereof which are facing one another.

The wear ring 10 comprises a front side 16 and a rear side 18 which are facing away from one another and two lateral flanks 20, 22. The wear ring 10 is made in one piece and consist of an elastically deformable plastic or reinforced plastic material. For instance, the plastic material can comprise fibers (not shown in the Figures) or other suitable mechanically and/or thermally reinforcing compounds or a dry lubricant as needed.

The wear ring 10 features a recess 24 which, by way of example, is arranged on its rear side 18. The recess may extend over the entire circumferential extension L of the wear ring 10. The function of the recess 24 is explained in further detail below. The central axis of the wear ring is designated 26 and the median plane of the wear ring 10 is designated 28. The width of the wear ring is designated W.

Figure 2:
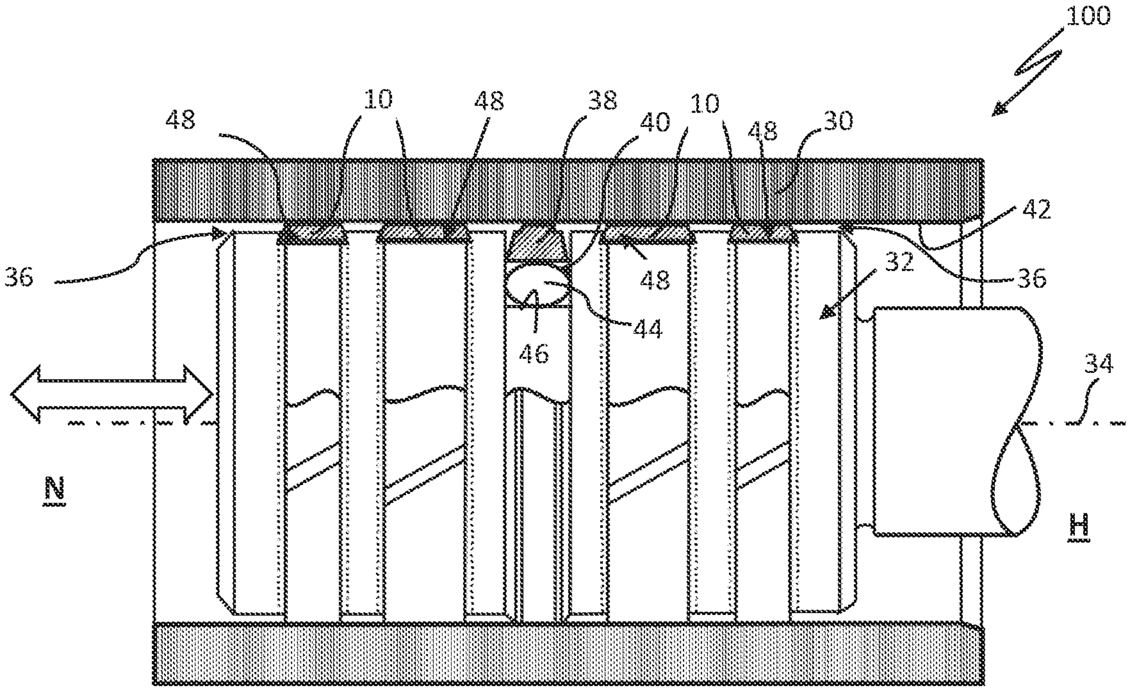
FIG. 2 is a sectional view of a wear ring arrangement according to the invention comprising a first and a second machine component, here a piston or piston rod and a cylinder, and several wear rings clipped into their predetermined mounting position within a mounting groove of one of the machine components for guidance of the first and second machine component relative to one another.

FIG. 2 depicts a cross-sectional view of a wear ring arrangement 100 comprising a first machine component 30 and a second machine component 32 which are arranged spaced apart from one another and which are movable relative to one another along a movement axis 34. The wear ring arrangement 100, as a mere example, is the formed as a piston-cylinder unit, wherein the first machine component 30 is a cylinder and the second machine component 32 is a piston or a piston rod. Said piston-cylinder unit can, for instance, be used in a hydraulic or pneumatic pump. The two machine components 30, 32 can, in particular, be made of metal.

There is a sealing gap 36 formed in a radial direction between the two machine components 30, 32. At least one sealing element (sealing ring) 38 serves to seal off a high-pressure side H relative to a low-pressure or atmospheric side N of the wear ring arrangement 100. The sealing element 38 is seated in a holding groove 40 of the second machine component 32. It is to be understood, that there can alternatively be two or more such sealing elements 38 arranged in a respective holding groove 40 wherein the holding grooves 40 are arranged spaced apart from one another in an axial direction with respect to the movement axis 34.

The sealing element 38 is pretensioned in a radial direction against a counter surface 42 of the first machine component 30 in a dynamically sealing manner by a pretensioning element 44. The pretensioning element 44 itself is arranged in the holding groove 40 and may, for instance, be formed as an elastomeric O-ring. The pretensioning elements 44 abuts against both the sealing element 38 and the respective groove base 46 of the holding groove 40 in a statically sealing manner.

There are several slit wear rings 10 which are each arranged spaced apart from each other in an axial direction and each of which is seated in a respective mounting groove 48 of the second machine component 32. Each of the wear rings 10 projects in a radial direction into the sealing gap 36 and may abut against the sealing surface 42 of the first machine component 30 intermittently or at all times. During operation of the wear ring arrangement 100, the wear rings 10 guide the second machine element 32 and absorb transverse loads as well as prevent an adverse and possibly detrimental direct (metal-to-metal) contact between the two machine components 30, 32. It is understood that the plastic or reinforced plastic material of the wear rings 10 needs to have a sufficient load capacity, and advantageously allows for a low friction and a stick-slip free operation. The wear rings 10 further protect the critical sealing element 38 from an unwanted overload.

Figure 3:
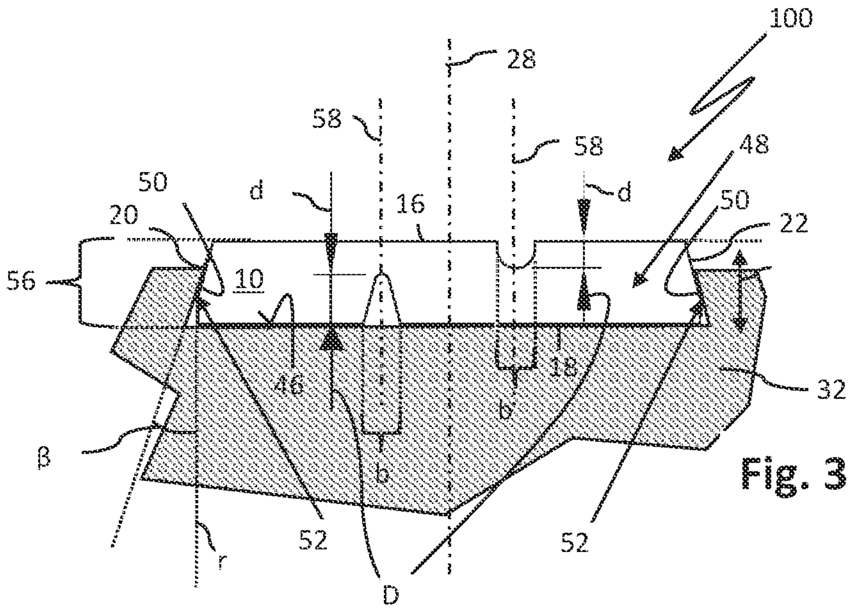
FIG. 3 is a cross-sectional detailed view of the wear ring assembly according to FIG. 2.

Each of the mounting grooves 48 of the second machine component 32 shows a cross-section that widens in a radial direction towards the groove base 46 of the mounting groove as depicted in more detail in FIG. 3. The groove flanks 50 of the respective mounting groove 48 thus each form an undercut 52 behind which the respective wear ring 10 engages in a radial direction. The base segment 10*a* of the wear ring 10 has a cross-sectional shape which corresponds or basically corresponds to the cross-sectional shape of the mounting groove 48. According to the embodiment shown in FIGS. 2 and 3, the wear ring 10 may has sloped or chamfered flanks 20, 22 which engage behind the undercut 52 formed by correspondingly slanted mounting groove flanks 50. The flanks 20, 22 of the wear ring as well as the groove flanks 50 of the mounting groove 48 are arranged at an acute angle β with respect to the local radius r of the wear ring 10.

The second machine element 32 and the respective wear ring 10 seated therein, each form a dovetail joint by which the wear ring 10 is securely fixed in its predetermined mounting position. The dovetail-joint allows for a mounting of the wear ring 10 on the respective machine component 30, 32 without the need for further fixation means such as glue and the like.

As has been pointed out above, each wear ring 10 consists of an elastically deformable plastic or reinforced plastic material. To further facilitate mounting of the wear ring 10 within the mounting groove of the respective machine component 30, 32, the wear ring 10 is provided with one recess 24 (FIG. 1) or more recesses 24 on its front side 16 and/or on its rear side 18 which allow for an easier twisting/bending (or carding) of the slit wear 10 ring.

Figure 4:
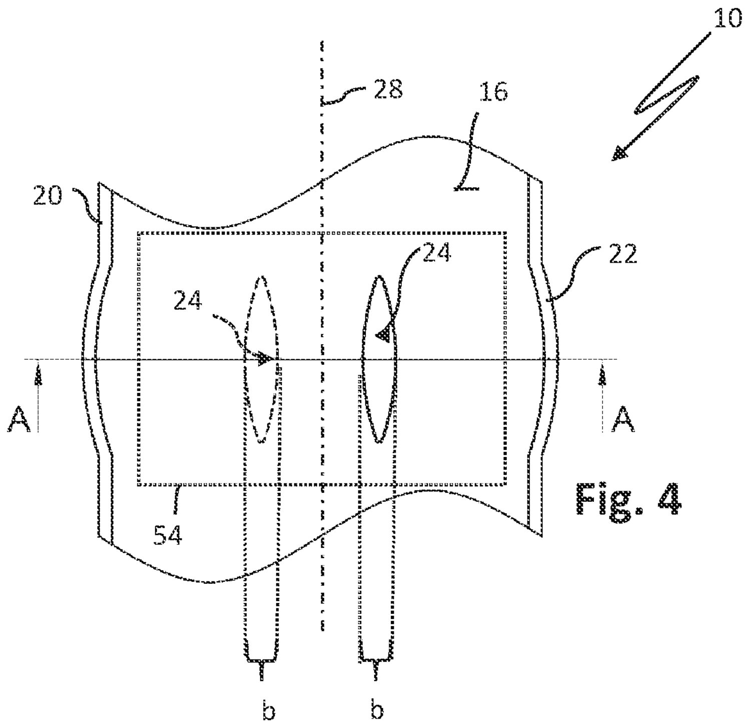
FIG. 4 is a top view of the wear ring according to FIG. 3.

According to the embodiment of the wear ring 10 shown in FIGS. 3 and 4, there is provided a plurality of recesses both on the front side 16 as well as on the rear side of the wear ring 10. The recesses of each side 16, 18 of the wear ring 10 are arranged spaced apart from one another in the circumferential direction of the wear ring 10.

The number of recesses 24 per surface area 54 of the wear ring 10, their dimensioning, in particular depth, is preferably chosen dependent on the elastic material properties and the geometry of the respective wear ring 10.

All recesses of the front side 16 and/or all the recesses of the rear side 18 of the wear ring 10 may have the same dimensions. However, the recesses 24 of the front side 16 may actually differ from the recesses 24 of the rear side 18, in particular have a different, e.g., smaller, depth d (as is shown in FIG. 3) and/or different, e.g., smaller, maximum width b.

Of note, in each cross-section of the wear ring 10 showing a single recess 24 or a plurality of recesses 24, the overall depth D of all recesses 24 in each cross-section of the wear ring 10 over its entire circumferential extension is advantageously greater than two thirds of the nominal thickness 56 of the wear ring 10.

Further, the recesses 24 of the front side 16 and recesses 24 of the rear side 18 of the wear ring 10 are preferably spaced from one another in the direction of the central axis 26 (FIG. 1) of the wear ring 10 in any cross section of the wear ring 10. By this, an undesirable damage to or rupture of the wear ring 10 during mounting as well as during operation thereof can be prevented. Further, as depicted in FIG. 3, the center axis 58 of the recesses 24 of the wear ring 10 can be arranged parallel to the median plane 28 of the wear ring 10.

Figure 5:
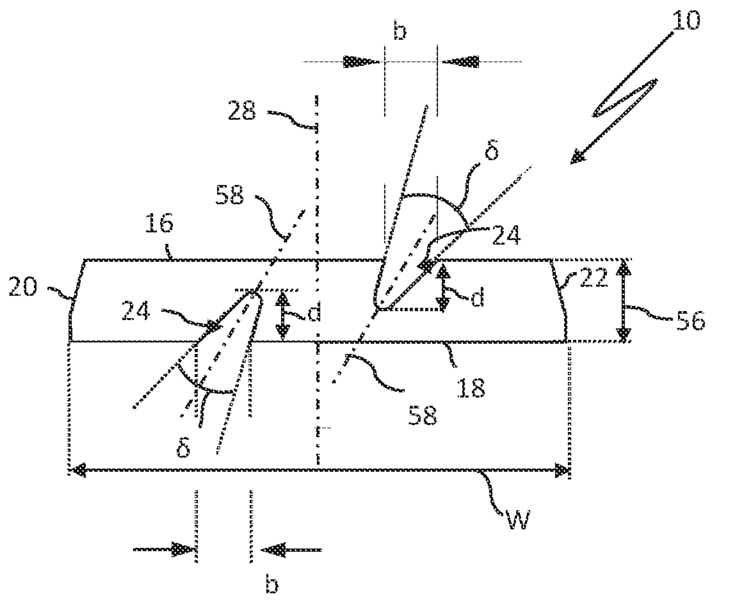
FIG. 5 is a cross sectional view of a further embodiment of the wear ring according to the invention.

According to the wear ring 10 shown in FIG. 5, the center axis 58 of the respective recesses 24 can also be arranged inclined relative to the median plane 28 of the wear ring 10. This may actually be beneficial in wider wear rings 10 or wear rings 10 with a larger diameter as this allows for an increased extension of the recesses 24 into the wear ring 10 without putting the wear ring 10 at risk for mechanical failure.

Figure 6:
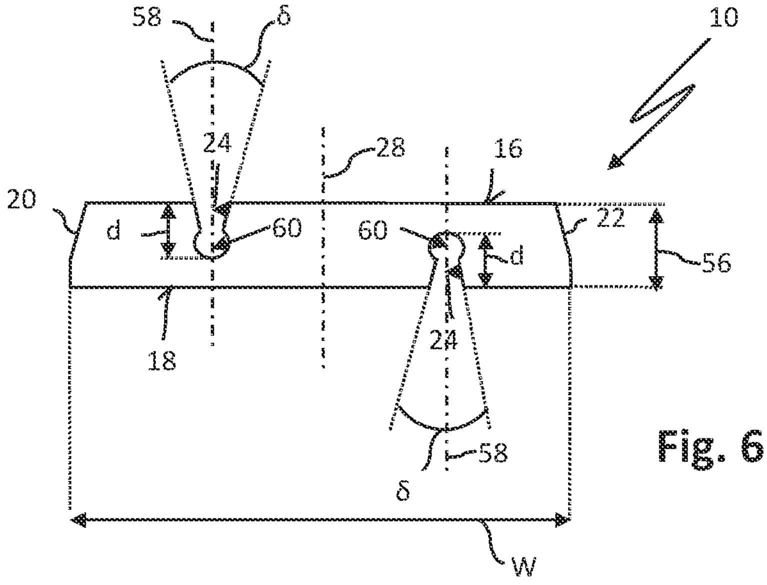
FIG. 6 is a cross sectional view of a further embodiment of the wear ring according to the invention.

According to FIGS. 5 and 6, the respective opening angle δ of at least part or all of the recesses 24 of the wear ring 10 is preferably between 25° and 60°, in particular between 30° and 50°. The recesses 24 of the wear ring 10 can have the same or different opening angles δ.

The recesses 24 can be extending in a strictly circumferential direction of the wear ring. However, the recesses 24 may also be configured as holes with a circular, triangular or other suitable geometry for increasing the deformability of the wear ring 10. Of note, the recesses 24 have a further advantage. As particulate matter tends to build up between in the sealing gap 36 (FIG. 2) of the wear ring arrangement 100 after a prolonged operation time, the recesses 24 can take up such particulate matter to help prevent jams of the machine components 30, 32 arranged movably relative to one another.

According to FIG. 6, at least part of the recesses 24 of the wear ring 10 may widen in the radial direction with respect to the median plane 28 (FIG. 1) of the wear ring 10 and thus show a dilated bottom section 60.

Figure 7:
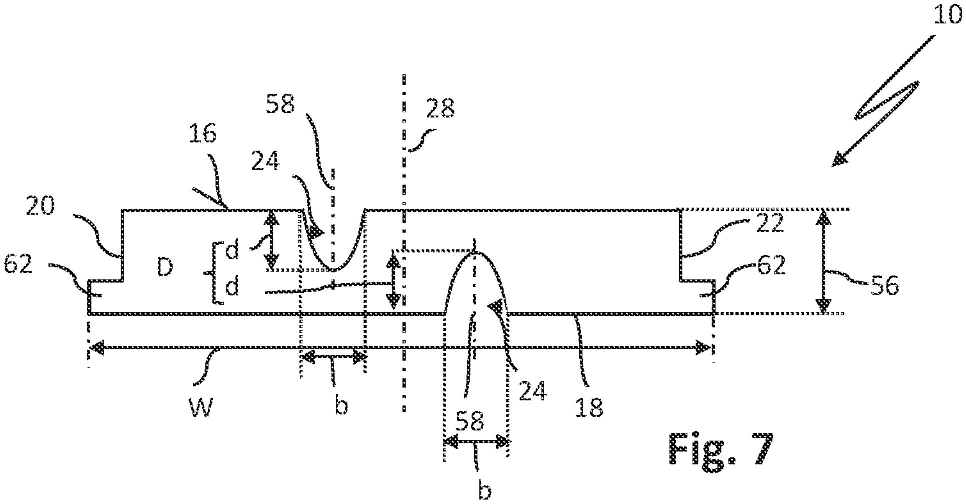
FIG. 7 is a cross sectional view of a further embodiment of the wear ring according to the invention.

The wear ring 10 does not necessarily need to have chamfered side flanks 20, 22 to engage behind undercuts 52 (cf. FIG. 3) formed by the groove flanks 50 of the mounting groove 48 of the respective machine element 30, 32. The wear ring 10 may, for instance, alternatively show a T-shaped cross section as depicted in FIG. 7. The wear ring 10 hence has a lateral projection 62 on each of his lateral flanks 20, 22. These lateral projections 62, merely by way of non-limiting example, each may have a rectangular cross-sectional shape. The lateral projections 62 engage behind a correspondingly formed undercut 52 (FIG. 3) of the mounting groove flanks 50. The mounting groove 48, in this instance, shows a correspondingly formed T-shaped cross-section.

Figure 8:
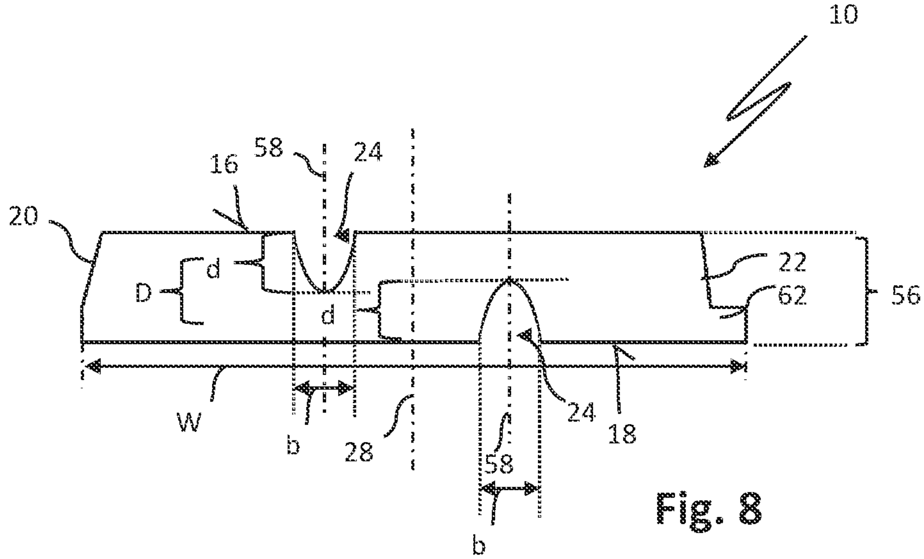
FIG. 8 is a cross sectional view of a further embodiment of the wear ring according to the invention.

According to a further embodiment shown in FIG. 8, the wear ring 10 may alternatively feature a chamfered first flank 20 and a second flank 22 having a lateral projection 62 as described above in context with FIG. 7. The lateral projection 62 and/or the chamfered flank 20 of the wear ring 10 may extend over the entire circumferential extension L (FIG. 1) of the wear ring 10. Alternatively, the lateral projections 62 and/or the chamfered flanks 20, 22 are just provided sectionally on the wear ring 10 along the circumferential direction thereof.

Figure 9:
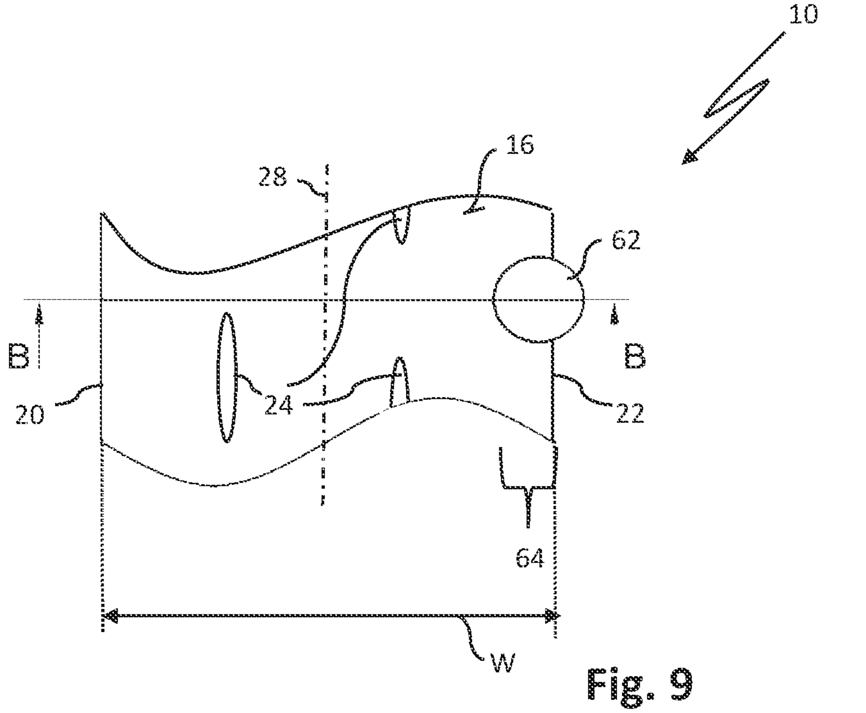
FIG. 9 is a top view of a further wear ring according to the invention.
Figure 10:
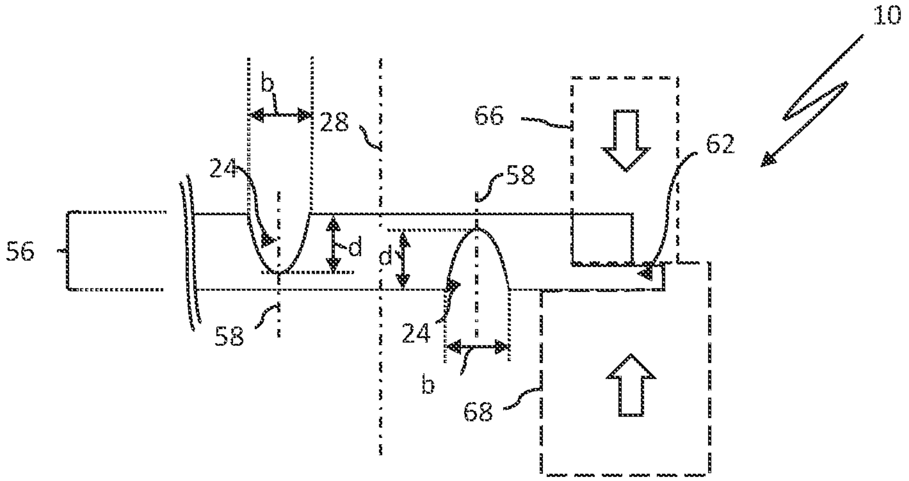
FIG. 10 is a cross-sectional view of the wear ring according to FIG. 9 cut along the sectional plane designated B-B in FIG. 9.

In FIG. 9, for example, there is shown a partial view of a wear ring 10 which has several lateral projections 62 extending from both of its flanks 20, 22. The lateral projections 62, on each flank 20, 22, are arranged spaced apart from one another in the circumferential direction of the wear ring 10. The lateral projection 62 shown in FIG. 9 is depicted in FIG. 10 in a cross-sectional view of the wear ring 10 along sectional plane "B-B" in FIG. 9. Each of said lateral projections 62 can be formed either right by molding the wear ring 10 or, alternatively, by pressure shaping 5 the lateral edge portion 64 of the wear ring 10 (FIG. 9). This can be done, for instance, by means of a compression die 66 and a thrust bearing 68 as shown in dotted lines in FIG. 10. This allows for a simple and cost-effective manufacturing of the wear ring 10 independently of its actual size.

Figure 11:
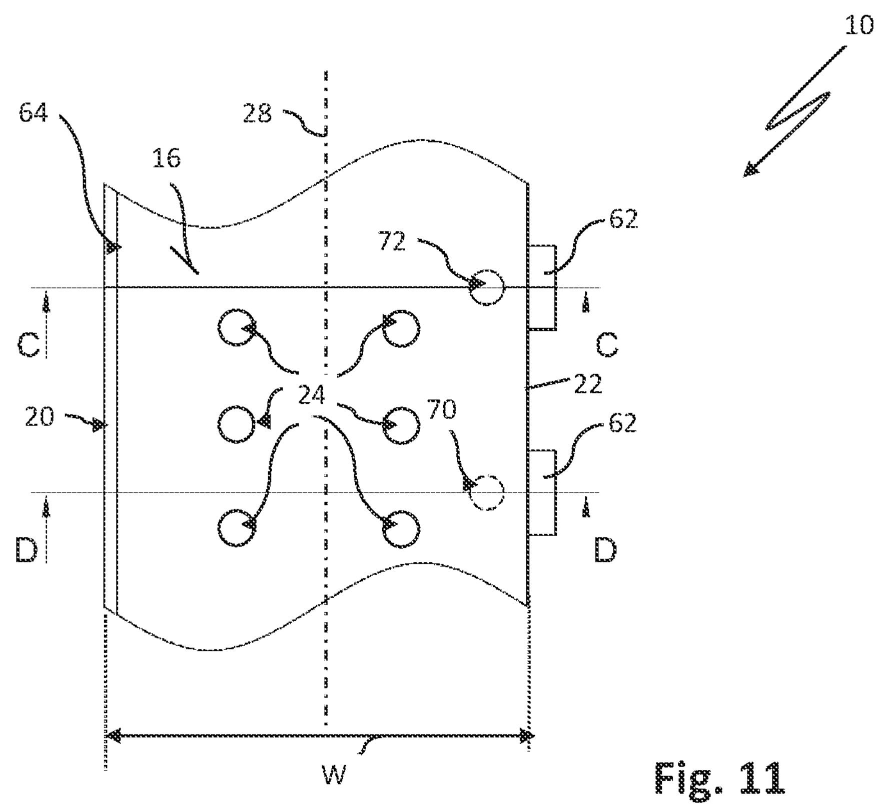
FIG. 11 is a top view of further embodiment of the wear ring according to the invention having circular recesses on its front side only as well as lateral projections on one of its flanks.

To further improve the plastic flow of the wear ring 10 material during the pressure shaping there can be made a further impression 70 or even a perforation 72 which, according to FIG. 11, is located offset inward in an axial direction with regards to the center axis 26 of the wear ring 10 (cf. FIG. 1) in relation to the lateral projection 62 to be formed. The wear ring 10 may, according to FIG. 11, have a plurality of circular recesses 24 formed on its front side for facilitating twisting/carding of the wear ring during insertion in the mounting groove 48 (FIG. 2). The circular recesses may be blind or even through-holes.

Figure 12:
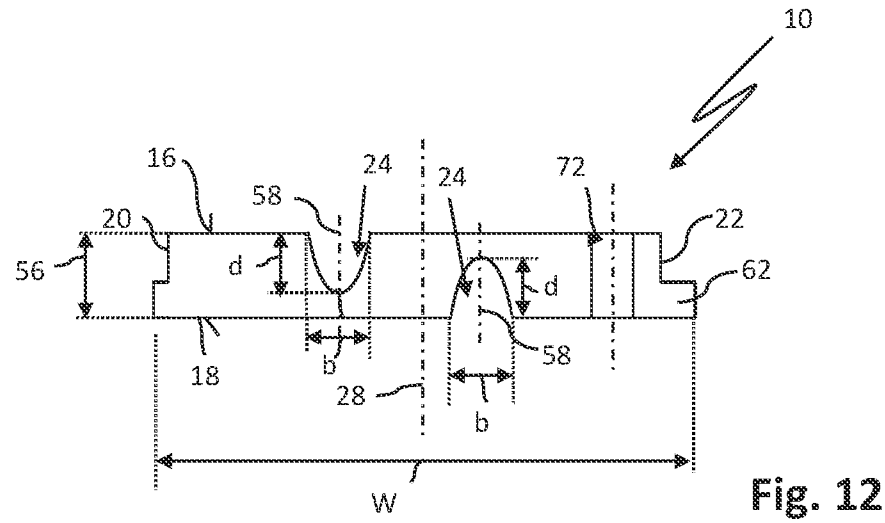
FIG. 12 is a cross-sectional view of the wear ring according to FIG. 11 cut along the sectional plane designated C-C in FIG. 11.
Figure 13:
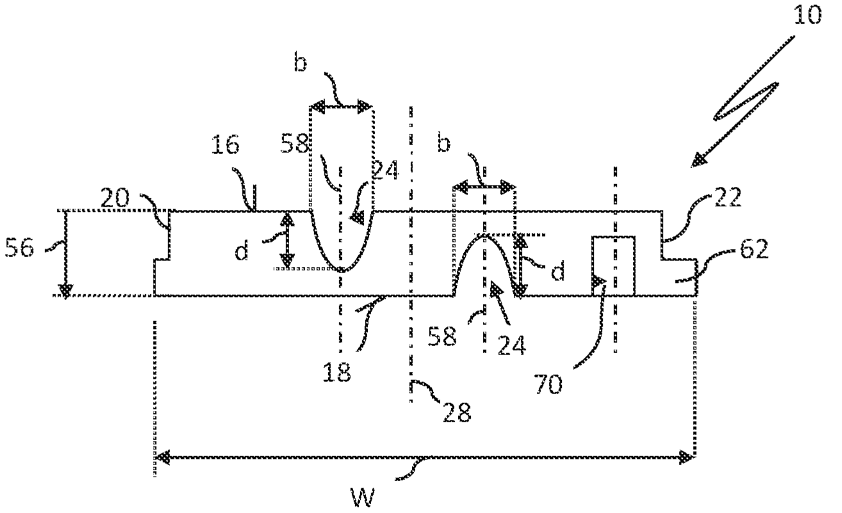
FIG. 13 is a cross-sectional view of the wear ring according to FIG. 11 cut along the sectional plane designated D-D in FIG. 11.

The perforation 72 is depicted in more detail in the cross-sectional view according 20 to FIG. 12 along section "C-C" in FIG. 11 of the wear ring, whereas in FIG. 13, the impression 70 is shown in more detail in a cross-sectional view along section "D-D" in FIG. 11.

Figure 14:
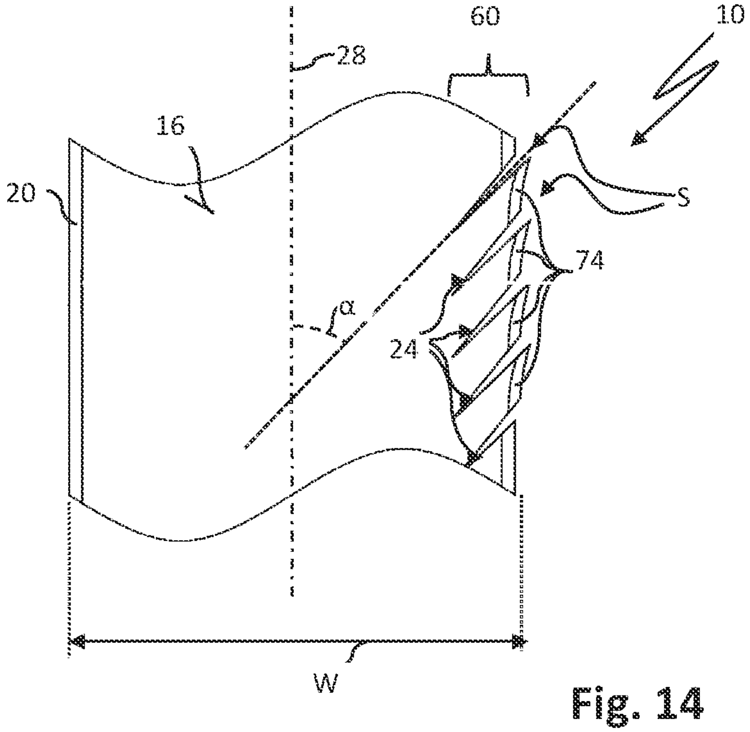
FIG. 14 is a top view of further embodiment of the wear ring according to the invention which has a serrated edge portion on one of its sides.

According to the further wear ring 10 shown in FIG. 14, the edge portion 64 of the wear ring 10 can be serrated. The serrations 74 may be simply formed by lateral incisions or through-recesses 24 which run at an acute angle α with respect to the median plane 28 of the wear ring 10. These serrations 74 can be flexed relative to the remaining wear ring 10 and thus allow for a rather simplified mounting the wear ring 10 in the mounting groove 48 of the respective machine element 30, 32 (FIG. 2).

What is claimed is:

1. A wear ring for guidance of two machine components which are arranged movably relative to one another along/around a movement axis, the wear ring being formed in one piece from a plastic or a reinforced plastic material and which is slit wherein it has two free ends, wherein the wear ring has a radial outer side, a radial inner side and two side flanks, wherein the wear ring has a cross-sectional width W, which, with respect to a wear ring's central axis, at least sectionally increases in a radial direction towards the radial inner side thereof and wherein the wear ring has one or more recesses formed on the radial outer side and/or on the radial inner side, wherein the recesses of the radial outer side and the recesses of the radial inner side are spaced from one another in the direction of the central axis of the wear ring and wherein the recesses of each side of the wear ring are arranged spaced apart from one another in the circumferential direction of the wear ring, wherein the one or more recesses are not sharing an edge to either of the two side flanks but are disposed at least a distance apart from the two side flanks wherein a surface portion of the radial inner side or the radial outer side is disposed between the one or more recesses and the two side flanks.

2. The wear ring according to claim 1, wherein the wear ring has a cross-sectional nominal thickness that is defined from the radial outer side to the radial inner side, and wherein the wear ring, in each of its cross-sections, has a single recess or a plurality of recesses, the overall depth d of all recesses of each the respective cross-sections being greater than two thirds of the nominal thickness of the wear ring.

3. The wear ring according to claim 1, wherein the recesses are formed as grooves or as circular holes.

4. The wear ring according to claim 3, wherein each of the recesses has flanks in the cross section of the wear ring, which are arranged symmetrically relative to a center axis of the respective recess, the center axis being arranged parallel to a median plane of the wear ring.

5. The wear ring according to claim 3, wherein in the cross-section of the wear ring, the center axis of at least part of the recesses is inclined with respect to a median plane of the wear ring.

6. The wear ring according to claim 3, wherein, in a cross-sectional view of the wear ring, at least part of the recesses shows a dilated bottom section.

7. The wear ring according to claim 1, wherein the wear ring has, at least sectionally, a dovetail cross-sectional shape.

8. The wear ring according to claim 1, wherein the wear ring, on at least one or on both of its side flanks, has one or more lateral projections extending away from the respective side flank.

9. The wear ring according to claim 8, wherein the plurality of lateral projections on a respective side flank of the wear ring are arranged spaced apart from one another in the circumferential direction of the wear ring at regular intervals.

10. The wear ring according to claim 8, wherein the lateral projections have a triangular or a rectangular cross-sectional shape.

11. The wear ring arrangement comprising:

the two machine components being a first and a second machine component which are arranged movably along/around the movement axis relative to one another; and the wear ring having the features according to claim 1 and which is clipped into a mounting groove with bilateral undercuts of one of the said machine components in a detachable fashion.

12. The wear ring arrangement according to claim 11, wherein the machine component having the mounting groove and the wear ring are joined together by a dovetail joint.

13. The wear ring arrangement according to claim 11, wherein the wear ring arrangement is formed as a piston-cylinder unit and wherein the first machine component is a cylinder and the second machine component is a piston or a piston rod.

14. The wear ring according to claim 1, wherein the wear ring has a cross-sectional nominal thickness that is defined from the radial outer side to the radial inner side, and wherein the thickness is less than the width.

15. The wear ring according to claim 14, wherein the nominal thickness is at least less than half the width.

* * * * *